United States Patent
Morgan et al.

(10) Patent No.: US 7,656,941 B2
(45) Date of Patent: Feb. 2, 2010

(54) METHOD FOR SYNCHRONIZING AN EQUALIZER OUTPUT DATA

(75) Inventors: Yves-Marie Morgan, Vannes (FR); Maryline Helard, Rennes (FR); Charlotte Langlais, Rennes (FR)

(73) Assignee: France Telecom, Paris (FR)

( * ) Notice: Subject to any disclaimer, the term of this patent is extended or adjusted under 35 U.S.C. 154(b) by 427 days.

(21) Appl. No.: 10/532,026

(22) PCT Filed: Oct. 13, 2003

(86) PCT No.: PCT/FR03/03010

§ 371 (c)(1),
(2), (4) Date: Apr. 21, 2005

(87) PCT Pub. No.: WO2004/040814

PCT Pub. Date: May 13, 2004

(65) Prior Publication Data

US 2006/0050818 A1 Mar. 9, 2006

(30) Foreign Application Priority Data

Oct. 25, 2002 (FR) ................................ 02 13375

(51) Int. Cl.
- H03H 7/30 (2006.01)
- H03H 7/40 (2006.01)
- H03K 5/159 (2006.01)

(52) U.S. Cl. ................... 375/232; 375/371; 708/323

(58) Field of Classification Search ......... 375/229–236, 375/354, 362, 364–368, 371, 219, 222, 316, 375/346; 708/100, 200, 300, 322, 323
See application file for complete search history.

(56) References Cited

U.S. PATENT DOCUMENTS

| | | | | |
|---|---|---|---|---|
| 5,909,466 A * | 6/1999 | Labat et al. | ................. | 375/233 |
| 5,940,454 A | 8/1999 | McNicol et al. | | |
| 6,813,325 B1 * | 11/2004 | Lin | ........................... | 375/354 |
| 6,993,083 B1 * | 1/2006 | Shirakata et al. | ............ | 375/260 |
| 7,027,499 B2 * | 4/2006 | Peon et al. | .................. | 375/232 |

(Continued)

FOREIGN PATENT DOCUMENTS

| | | |
|---|---|---|
| CN | 1278127 | 12/2000 |
| EP | 1 063 824 | 12/2000 |
| FR | 2 738 967 | 3/1997 |

OTHER PUBLICATIONS

C. Laot et al., "Turbo Equalization: Adaptive Equalization and Channel Decoding Jointly Optimized," IEEE Transactions on Communications, vol. 19, No. 9, Sep. 2001.*

J. Labat et al., "Adaptive Decision Feedback Equalization: can you skip the training period?", IEEE Transactions on Communications, vol. 46, No. 7, Jul. 1998.

*Primary Examiner*—Shuwang Liu
*Assistant Examiner*—James M Perez
(74) *Attorney, Agent, or Firm*—Cohen Pontani Lieberman & Pavane LLP

(57) ABSTRACT

A method for synchronizing symbols at the output of a blind equalizer, the method being characterized by the following steps: on sending, inserting into a succession of sent symbols, one or more known sequences of symbols repeated in said succession of symbols; detecting said one or more known sequences at the output of said blind equalizer; deducing any shifting of the symbols at the output of the blind equalizer from the result of said detection; and retiming the symbols at the output of the blind equalizer as a function of the deduced shift.

7 Claims, 4 Drawing Sheets

U.S. PATENT DOCUMENTS 7,167,507 B2 * 1/2007 Mailaender et al. ......... 375/148
2002/0154690 A1 * 10/2002 Okazaki .................... 375/232
2002/0181576 A1 * 12/2002 Kennedy et al. ............ 375/233
2004/0062279 A1 * 4/2004 Primrose et al. ............ 370/503

* cited by examiner

METHOD FOR SYNCHRONIZING AN EQUALIZER OUTPUT DATA

RELATED APPLICATIONS

This is a national stage of application no. PCT/FR2003/003010, filed Oct. 13, 2003.

This patent application claims the priority of French patent application No. 02 13375 filed Oct. 25, 2002, the disclosure content of which is hereby incorporated by reference.

FIELD OF THE INVENTION

The present invention relates to a method for synchronizing an output data from a blind equalizer.

BACKGROUND OF THE INVENTION

Digital communications systems conventionally use receivers that include, in cascade, demodulator means, equalizer means, decoder means, etc.

The function of the equalizer means is to combat intersymbol interference caused in particular by the presence of multiple paths that are static or non-static over time.

Many kinds of equalizer means are already known in the art.

Historically speaking, the first systems used to combat intersymbol interference were essentially "synchronous" linear transversal filters.

Other equalizer structures that have been used include recursive non-linear decision feedback equalizers (DFEs) in which data that has been decided on is injected into a backward filter constituting the recursive portion of the equalizer.

The above kind of equalizer structure is generally used for transmission channels with adaptation algorithms for adjusting the parameters of the structures, in which case equalization is carried out in two stages. During a first stage, the structure is controlled by known training sequences that are inserted into the frames that are sent and cause the equalizer algorithm to converge. During the second stage, the structure becomes self-adaptive, i.e. it controls itself on the basis of its own decisions.

However, using a training stage has a serious drawback; in particular, it corresponds to a loss of efficiency in terms of bit rate.

For this reason considerable research has already been conducted with a view to proposing blind equalizer systems whose structure is able to converge towards an optimum solution in a "self-trained" manner, i.e. without using training sequences.

Blind equalizers that use different adaptation algorithms and structures according to the severity of the transmission channel have recently been proposed in patent application FR 2 738 967 and in a paper by J. Labat, O. Macchi and C. Laot "Adaptive Decision Feedback Equalization: can you skip the training period?", IEEE Transactions on Communications, Vol. 46, No. 7, July 1998.

In particular, when reception is difficult, those equalizers use a convergence structure that includes, in cascade, a purely recursive filter and a transversal filter, whereas when reception is easy, they function in a tracking mode that uses conventional DFE structures, the decision to switch from one mode of operation to the other being a function of the performance achieved at the equalizer output.

It should be noted that the reversible nature of the change from one of the above two modes of operation to the other means that those equalizers can always function with a configuration that corresponds to optimum performance. They can therefore operate according to their own decisions with no risk of divergence, unlike conventional DFE. This essential property enables them to adapt to severe channel fluctuations, and therefore makes them particularly suitable for non-stationary channels, such as mobile radio channels, ionospheric channels, and submarine acoustic channels.

SUMMARY OF THE INVENTION

First tests on blind equalizers have shown loss of timing phenomena that can be blamed on the adaptive nature of the equalizers, which, in the presence of a plurality of echoes in the received signal, do not always tend to adapt to the same echo, and then switch from one echo to another.

This results in lags or leads in the reproduction of symbols, i.e. to symbols being eliminated from or added to the stream of data.

This is illustrated by the following example.

H is a channel characterized by its impulse response as described by a matrix H such that:

$$H=[h_0 0 \ldots 0 \; h_{16} \; 0 \ldots 0]^T$$

The symbols sent and received satisfy the following equation, in which d(n) represents the symbols sent and r(n) represents the symbols received:

$$r(n)=h_0 \cdot d(n)+h_{16} \cdot d(n-16)$$

At the start of transmission, the data is received on a first channel C1 corresponding to $h_0=1$ and $h_{16}=0$.

Since the main send/receive path varies during transmission, the equalizer switches to another channel corresponding to $h_0=0$ and $h_{16}=1$, for example (i.e. to the channel C2, corresponding to the second path, which has become the main path).

The table below shows that considering the second path as the main path leads to repeating the data d(4) and the subsequent data at the output of the equalizer and therefore to the creation of a non-zero error e(n).

TABLE 1

| | Example of shifting of data | | | | | | | |
|---|---|---|---|---|---|---|---|---|
| N | 16 | 17 | 18 | 19 | 20 | 21 | 22 | 23 |
| Ch. | $C_1$ | $C_1$ | $C_1$ | $C_1$ | $C_2$ | $C_2$ | $C_2$ | $C_2$ |
| d(n) | d(16) | d(17) | d(18) | d(19) | d(20) | d(21) | d(22) | d(23) |
| r(n) | d(16) | d(17) | d(18) | d(19) | d(4) | d(5) | d(6) | d(7) |
| e(n) | ≈0 | ≈0 | ≈0 | ≈0 | d(4)-d(20) | d(5)-d(21) | d(6)-d(22) | d(7)-d(23) |

The change from the channel C1 to the channel C2 leads to lags in the reproduction of the symbols and therefore to the addition of symbols; conversely, switching from the channel C2 to the channel C1 leads to leads in the reproduction of symbols and therefore to the elimination of symbols.

The object of the invention is to alleviate this drawback and to propose a method of limiting the effects of losses of timing encountered in the functioning of blind equalizers.

To this end, the invention proposes a method of synchronizing data at the output from a blind equalizer, the method being characterized by the following steps: inserting synchronization sequences into the frames of symbols; detecting these sequences at the output from the equalizer; and retiming the frames of symbols as a function of the shift detected in these sequences.

BRIEF DESCRIPTION OF THE DRAWINGS

Other features and advantages of the invention come to light in the course of the following description, which is purely illustrative, is not limiting on the invention, and is given with reference to the accompanying drawings, in which.

DESCRIPTION OF ADVANTAGEOUS EMBODIMENT(S)

General Description of one Embodiment

Figure 1:
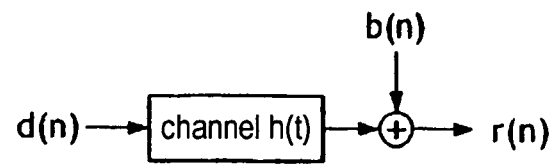
FIG. 1 represents a digital communications transmission channel.

FIG. 1 shows an input transmission channel over which successions of symbols d(n) are sent.

The channel is symbolized by a transfer function h(t) and by noise b(n) added at the output of the transfer function.

Figure 2:
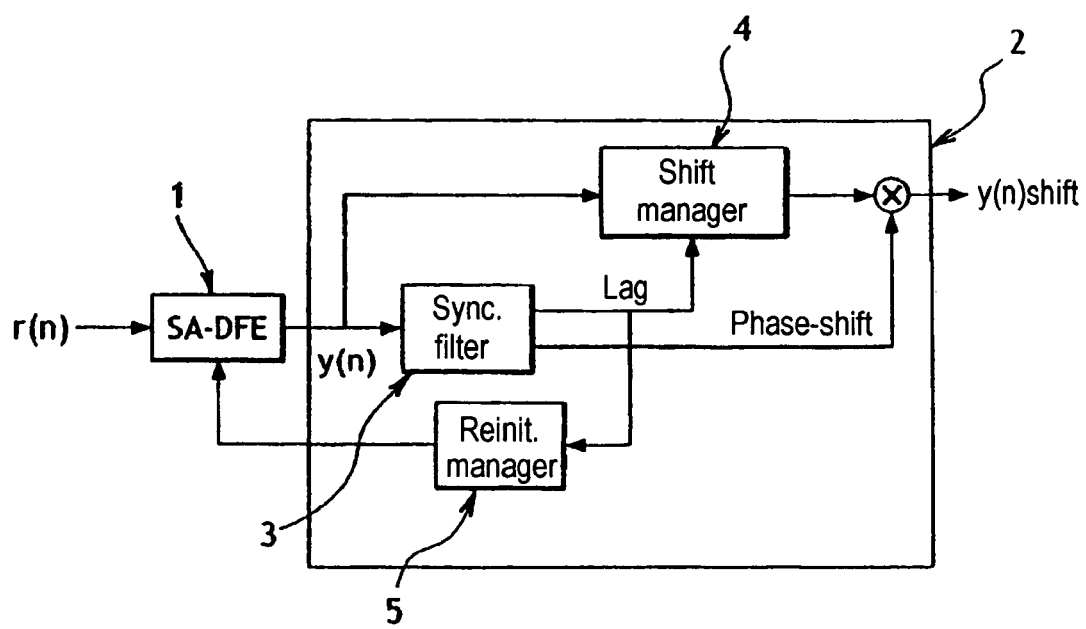
FIG. 2 represents signal processor means used at the output of that transmission channel in the context of the invention.

At the output of this transmission channel, the resulting symbols r(n) are received and processed in a receiver that includes in particular means of the type represented in FIG. 2.

These means include in particular a blind equalizer 1 which receives at its input the symbols r(n), which are filtered beforehand, where applicable, and processor means 2 whose function is to process the data y(n) at the output of the equalizer 1 to limit the effect thereon of the loss of timing phenomenon.

The processing effected by the processor means 2 consists in:
  detecting, in the frames of symbols at the output of the blind equalizer 1, known sequences SYNCH inserted into the frames of symbols d(n) at regular intervals,
  deducing any shift in the symbols processed by the equalizer 1, and
  retiming the data at the output of the equalizer as a function of the shift determined in this way.

Figure 3:
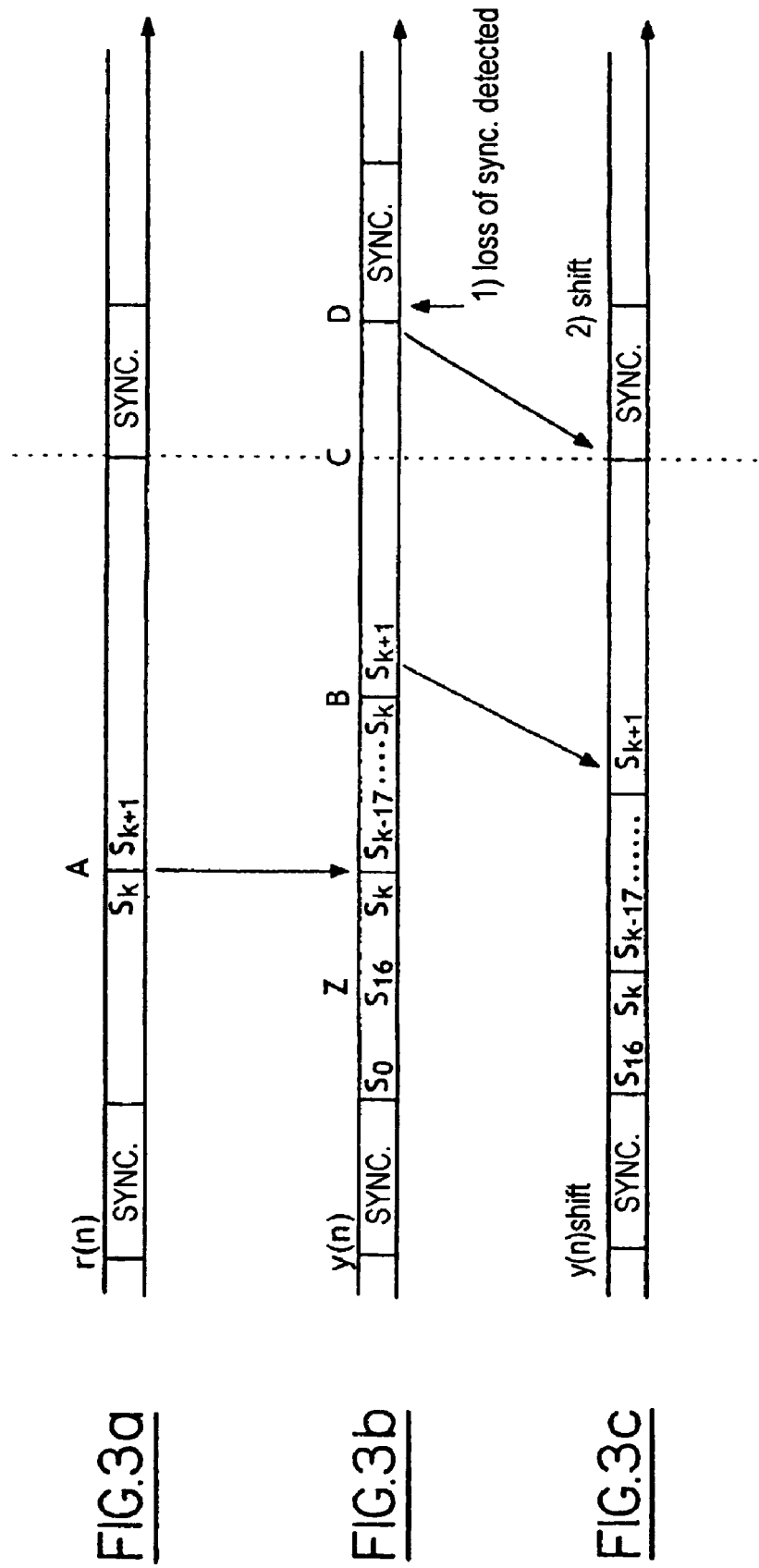
FIGS. 3a, 3b and 3c represent the loss of timing phenomenon and an example of data synchronization at the output of the blind equalizer.

This is represented in FIGS. 3a to 3c in particular.

FIG. 3a represents a succession of frames corresponding to symbols r(n) received by a receiver and sent to the input of the blind equalizer 1.

The received frames include the known sequences SYNCH at regular intervals.

FIG. 3b illustrates a loss of timing introduced by the blind equalizer 1.

Here the loss of timing is a loss that leads to adding symbols, reflected in the repetition of the symbols $S_{k-17}$ to $S_k$.

The symbols after and including the symbol $S_{k+1}$ are shifted accordingly, with the result that the sequence SYNCH that follows the loss of timing appears in the output data y(n) of the equalizer 1 at a time D instead of at an expected time C.

Correlating the data y(n) with the sequence SYNCH indicates the time D at which said sequence arrived and this enables the shift CD to be estimated.

FIG. 3c shows that, in order to retime the sequences SYNCH at the output of the equalizer, the succession of symbols is shortened or lengthened between the sequence SYNCH for which a shift (and thus a loss of timing) is detected and the preceding sequence SYNCH.

For example, in the situation represented in FIGS. 3a to 3c of a loss of timing that leads to adding symbols, the succession of symbols is shortened between the two sequences SYNCH by eliminating a number of symbols corresponding to the estimated shift after the sequence SYNCH that precedes the sequence SYNCH for which a shift is detected.

Of course, other solutions could be envisaged: in particular, eliminating symbols situated just ahead of the sequence SYNCH for which a shift is detected could be envisaged.

Example of Retimer Means

For the purposes of the retiming process that has just been described, the FIG. 2 processor means 2 include a synchronization filter 3 and a shift management unit 4.

The filter 3 and the management unit 4 each receive at their input the signal y(n) at the output of the blind equalizer 1.

Figure 4:
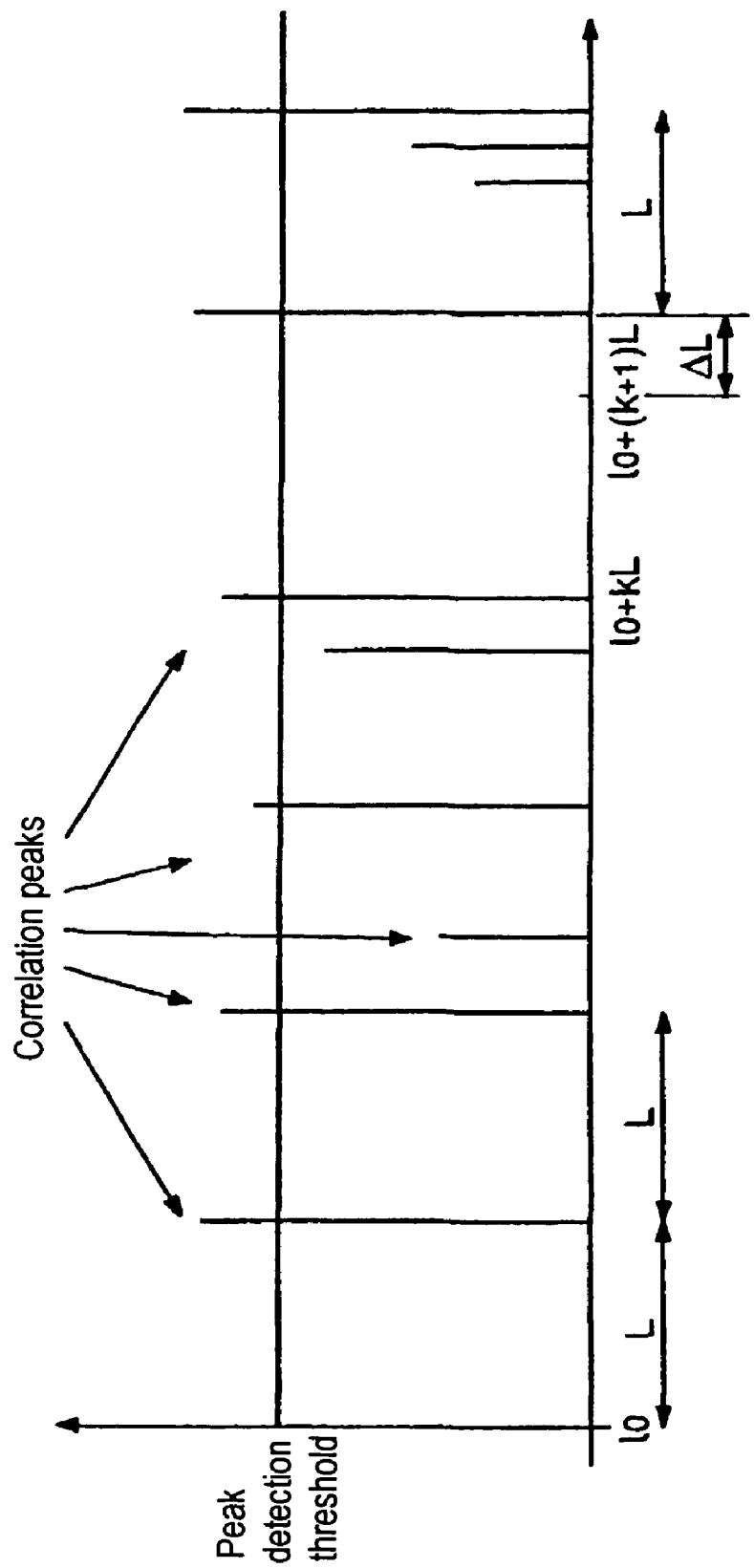
FIG. 4 represents the detection of shifts generated by losses of timing.

The filter 3 applies continuous correlation with the synchronization sequence and supplies at its output a signal of the type represented in FIG. 4.

That signal has peaks at times that correspond to the synchronization sequences SYNCH at the output of the equalizer.

The output of the filter 3 is normalized with respect to the power of the samples present in the filter.

Here a correlation peak is looked for in a frame equal to that of the sent data.

As can be seen in FIG. 4, a peak is detected in each frame, for example by searching for a maximum. The position of the peak relative to a reference time is used to detect any shift relative to the previous peak, and that shift is used to determine if a loss of timing has occurred.

To be more precise, the peak is detected by comparison with a given threshold, for example 0.7.

No shift is applied to the symbols y(n) at the output of the equalizer if no peak is detected, which is the case in particular if two paths have the same power or if the signal-to-noise ratio is particularly low.

The shift management module 4 shifts the output data stream in one direction or the other according to information concerning the lag in reproducing symbols obtained at the output of the synchronization filter 2. That shift in one direction or the other may easily be effected by means of a buffer to which the output data of the blind equalizer 1 is sent, for example. The size of the buffer is determined as a function of the maximum lag to be managed.

Note that the synchronization filter 3 and the correlation of the level of said filter with the synchronization sequence SYNCH are advantageously used to manage the phase shifting of the received signal in parallel with resolving phase ambiguity in the equalizer output symbols.

As shown in FIG. 2, the phase shift found by the filter 3 is therefore injected into the data y(n) at the output of the retimer module 4.

Synchronization Sequences

The synchronization sequences SYNCH are those used as training sequences if the receiver includes interference canceling means on the downstream side of the equalizer, for example.

Note that the size necessary for the synchronization sequences is less than the size necessary for the training sequences of equalizers that use training sequences.

For example, the synchronization sequences can occupy only some 30% of the frames, or even less.

One possible synchronization sequence is the following 31-bit pseudorandom sequence, for example:
[0000101011101100011111001101001]

which corresponds in this embodiment, and in the case of an MDP4 modulated signal, to the following succession of symbols:
[00 00 00 00 11 00 11 00 11 11 11 00 11 11 00 00 00 11 11 11 11 11 00 00 11 11 00 11 00 00 11].

Blind Equalizer Example

Figure 5A:
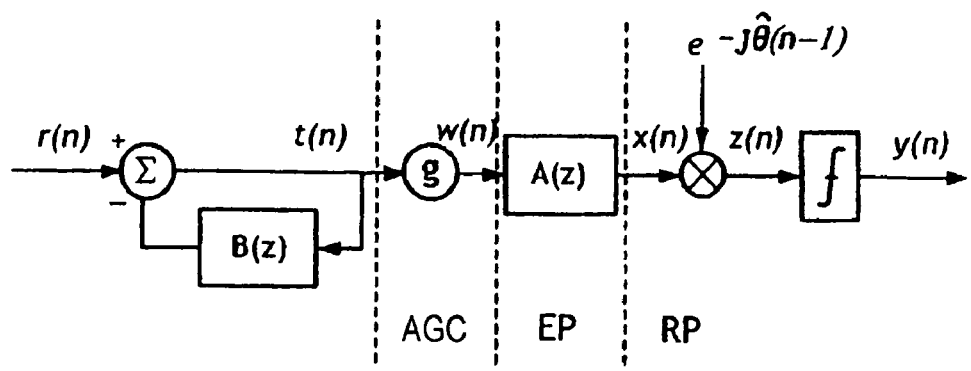
FIGS. 5a and 5b represent a blind equalizer structure used in convergence mode and in tracking mode, respectively.
Figure 5B:
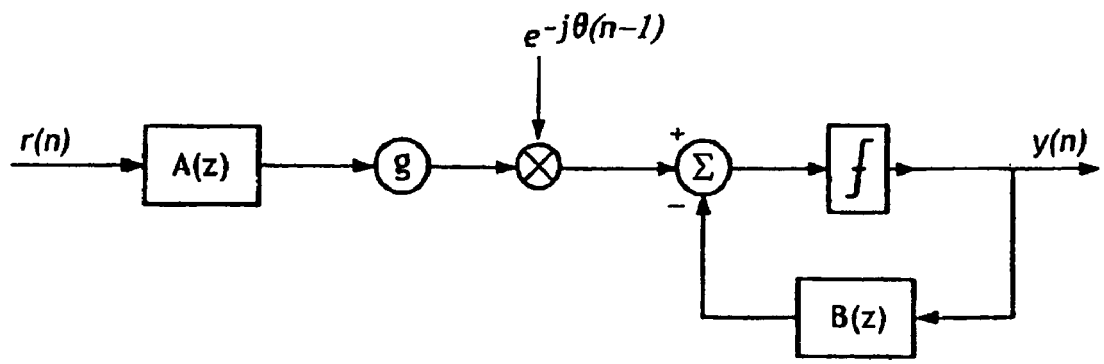

FIGS. 5a and 5b represent one possible structure of the blind equalizer.

The context is that of a self-adaptive decision feedback equalizer (SA DFE) with a suitable structure and a suitable algorithm of the type described in the paper and the patent application cited above.

As indicated above, this kind of equalizer has two modes of operation adapted to the severity of the transmission channel.

In an initial mode, called the convergence mode, the device comprises, in cascade, a purely recursive whitening filter B(z), a transversal filter A(z), an automatic gain controller, and a phase corrector. The criteria for updating the coefficients of the transversal and recursive portions are based entirely on an a priori knowledge of the statistics of the signal sent by the source. This initial mode is therefore perfectly "self-trained" (i.e. blind or "non-supervised"). FIG. 5a represents the structure of the SA DFE in the convergence mode.

When the equalization process is sufficiently advanced, which may be determined from the mean square error estimated from the decisions taken by the receiver, the structure and the adaptation criteria of the equalizer are modified so that the device switches to the tracking mode, in which the settings of the transversal and recursive filters are modified to convert the device into a conventional decision feedback equalizer (DFE). The condition for optimum overall functioning then becomes that of a minimum estimated mean square error. FIG. 5b represents the structure of the SA DFE in the tracking mode.

It is therefore clear that the equalizer has two different modes of operation associated with different structures and different criteria of optimum functioning. One essential feature of the equalizer is that this structural modification is totally reversible. This is beneficial because it allows reversion to a very robust mode of operation in severe situations. On the other hand, as soon as the channel becomes less severe, the system switches back to the tracking mode.

During the convergence phase, the coefficients of the filter A(z) are initialized to 0 except for one coefficient that is initialized to 1. That coefficient is positioned so that the filter approximates an anti-causal structure, that is to say, in the present example, toward the right.

$$A(z)=[0, 0 \ldots 0, 1, 0, 0, 0, 0]^T$$

The coefficients are then adapted using a constant modulus algorithm (CMA). For more details of CMA see Zhi Ding, Ye Geoffrey Li, "Blind Equalization and Identification", Signal Processing and Communications Series, 2001.

Reinitialization

Note that if the channel does not vary in time, the position of the coefficient equal to 1 determines the constant shift at the output of the blind equalizer to be taken into account.

Because the channels do vary in time here, this coefficient is caused to shift, and as soon as it shifts too far toward a causal structure (i.e. toward the left in the present example), the performance of the equalizer is degraded, as explained in the above publication by Zhi Ding et al.

In order for the performance of the equalizer not to be degraded the coefficients of the filter A(z) are then regularly reinitialized in accordance with an anti-causal structure in the manner described above.

This reinitialization can also lead to losses of timing.

In this case, the symbols are retimed using the synchronization sequences SYNCH.

The invention claimed is:

1. A method for synchronizing symbols at an output of a blind equalizer, the method comprising the steps of:
   on sending, inserting into a succession of sent symbols, one or more known synchronization sequences of symbols repeated at regular intervals in said succession of symbols;
   detecting said one or more known synchronization sequences in a succession of symbols at the output of said blind equalizer;
   deducing any shifting of the symbols in the succession of symbols at the output of the blind equalizer from the result of said detection; and
   retiming the symbols at the output of the blind equalizer, as a function of the deduced shift of the symbols, by eliminating symbols from or adding symbols to the succession of symbols at the output of the blind equalizer, between a synchronization sequence for which a shift is deduced and a preceding synchronization sequence, the number of symbols added or eliminated corresponding to the deduced shift of the symbols.

2. The method according to claim 1, wherein to detect a known synchronization sequence inserted, on sending, into a succession of symbols, the symbols at the output of the equalizer are correlated with said synchronization sequence, and the resulting correlation peaks are detected.

3. The method according to claim 2, wherein the detected correlation peaks are compared to a given threshold and the symbols are not retimed unless a peak higher than said threshold is detected.

4. The method according to claim 2, wherein the result of said correlation is used to determine information on the phase of the signal carrier that carries the received symbols and that information is used to resolve ambiguity as to the phase of the symbols at the output of the equalizer.

5. The method according to claim 1, wherein symbols are eliminated just after the synchronization sequence preceding the synchronization sequence for which a shift is detected.

6. The method according to claim 1, wherein the blind equalizer has a switchable structure, uses a switchable algorithm, and, in a convergence mode of operation, includes in cascade a purely recursive whitening filter and a matched transversal filter that is reinitialized as a function of the performance of the equalizer.

7. A digital communications receiver, comprising:
a blind equalizer;
means for detecting, at an output from said blind equalizer, a known synchronization sequence inserted into a succession of received symbols;
means for deducing from the result of said detection any shifting of the symbols at the output of the blind equalizer; and
means for retiming the symbols at the output of the blind equalizer, as a function of the deduced shift of the symbols, by eliminating symbols from or adding symbols to the succession of symbols at the output of the blind equalizer, between a synchronization sequence for which a shift is deduced and a preceding synchronization sequence, the number of symbols added or eliminated corresponding to the deduced shift of the symbols.

* * * * *